United States Patent
Rhyu et al.

(10) Patent No.: US 10,340,753 B2
(45) Date of Patent: Jul. 2, 2019

(54) STATOR OF PLANAR TYPE MOTOR, AND PLANAR TYPE MOTOR USING SAME

(71) Applicant: KOREA ELECTRONICS TECHNOLOGY INSTITUTE, Seongnam-si, Gyeonggi-do (KR)

(72) Inventors: Sehyun Rhyu, Bucheon-si (KR); Youngkyoun Kim, Seoul (KR); Jungmoo Seo, Goyang-si (KR); Jeongjong Lee, Incheon (KR); Insoung Jung, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 184 days.

(21) Appl. No.: 15/519,816

(22) PCT Filed: Oct. 27, 2014

(86) PCT No.: PCT/KR2014/010095
§ 371 (c)(1),
(2) Date: Apr. 17, 2017

(87) PCT Pub. No.: WO2016/060311
PCT Pub. Date: Apr. 21, 2016

(65) Prior Publication Data
US 2017/0250580 A1    Aug. 31, 2017

(30) Foreign Application Priority Data
Oct. 17, 2014  (KR) .......................... 10-2014-0140791

(51) Int. Cl.
*H02K 1/17*  (2006.01)
*H02K 1/18*  (2006.01)
(Continued)

(52) U.S. Cl.
CPC .................. *H02K 1/17* (2013.01); *H02K 1/02* (2013.01); *H02K 1/12* (2013.01); *H02K 1/148* (2013.01);
(Continued)

(58) Field of Classification Search
CPC .......... H02K 16/02; H02K 1/02; H02K 1/182; H02K 1/17; H02K 1/12; H02K 1/148;
(Continued)

(56) References Cited

U.S. PATENT DOCUMENTS 6,445,105 B1 * 9/2002 Kliman ................... H02K 1/14
310/156.35
6,809,453 B2 * 10/2004 Narita ................... H02K 17/02
310/216.008
(Continued)

FOREIGN PATENT DOCUMENTS

JP    10-145990 A    5/1998
JP    2007-104781 A    4/2007
(Continued)

OTHER PUBLICATIONS

International Search Report dated Jul. 1, 2015 in International Application No. PCT/KR2014/010095, filed Oct. 27, 2014.

*Primary Examiner* — Burton S Mullins
(74) *Attorney, Agent, or Firm* — Knobbe Martens Olson & Bear LLP (57) ABSTRACT

The described technology relates to a stator of a planar type motor and a planar type motor using the same, which are easy to manufacture and are capable of reducing core losses, thereby maximizing motor performance. First cores that are difficult to form by stacking electrical steel plates are formed of soft magnetic powders, and second cores that are formed by stacking electrical steel plates having the same size are arranged in a region where a vortex is concentrated, thereby (Continued)

allowing easy manufacture and being capable of maximizing the performance of the planar type motor.

7 Claims, 8 Drawing Sheets

(51) Int. Cl.
*H02K 37/08* (2006.01)
*H02K 1/02* (2006.01)
*H02K 1/12* (2006.01)
*H02K 21/24* (2006.01)
*H02K 1/14* (2006.01)
*H02K 3/52* (2006.01)
*H02K 41/03* (2006.01)

(52) U.S. Cl.
CPC ............. *H02K 1/187* (2013.01); *H02K 21/24* (2013.01); *H02K 37/08* (2013.01); *H02K 1/182* (2013.01); *H02K 3/525* (2013.01); *H02K 41/031* (2013.01)

(58) Field of Classification Search
CPC ........ H02K 1/187; H02K 21/24; H02K 37/08; H02K 3/525; H02K 41/031
USPC .............................................. 310/44, 156.37
See application file for complete search history.

(56) References Cited

U.S. PATENT DOCUMENTS

| | | | | |
|---|---|---|---|---|
| 7,145,277 B2* | 12/2006 | Naito | ................... | H02K 1/2793 310/156.32 |
| 7,323,799 B2* | 1/2008 | Naito | ..................... | H02K 1/148 310/216.077 |
| 7,705,494 B2* | 4/2010 | Inayama | ................... | H02K 1/02 310/216.067 |
| 8,310,126 B1* | 11/2012 | Hopkins | ................ | H02K 1/148 310/156.19 |
| 8,373,326 B2* | 2/2013 | Enomoto | ............... | H02K 1/148 310/156.32 |
| 2003/0057796 A1* | 3/2003 | Fan | ........................ | H02K 1/148 310/216.062 |
| 2007/0138904 A1* | 6/2007 | Chae | ..................... | H02K 1/148 310/268 |
| 2010/0156204 A1* | 6/2010 | Endo | ...................... | H02K 3/522 310/44 |
| 2010/0225195 A1* | 9/2010 | Asano | ..................... | F04B 39/00 310/216.067 |

FOREIGN PATENT DOCUMENTS

| | | |
|---|---|---|
| JP | 2010-246367 A | 10/2010 |
| KR | 10-0693404 B1 | 3/2007 |
| KR | 10-1207608 B1 | 12/2012 |

* cited by examiner

STATOR OF PLANAR TYPE MOTOR, AND PLANAR TYPE MOTOR USING SAME

FIELD

The described technology generally relates to a planar type motor, and more particularly, to a stator of a planar type motor which is used for driving an electric vehicle, a washer, and the like, and a planar type motor using the stator.

DESCRIPTION OF THE RELATED TECHNOLOGY

A planar type motor includes a stator configured to generate a magnetic field and a rotor provided to rotate with respect to the stator. The stator includes a plurality of cores which are disposed to have a predetermined distance therebetween in a circumferential direction thereof and protrude to a predetermined height in a direction of a shaft, and the cores are coupled to grooves formed in a stator body in the direction of the shaft. The rotor includes permanent magnets arranged to have a predetermined distance therebetween in a circumferential direction thereof and is provided to rotate in a state in which a predetermined gap is formed between the rotor and the stator. The planar type motor generates a repulsive or attractive force between the permanent magnets of the cores and the rotor to generate rotational torque by changing a direction of a current flowing through a winding wire.

Korean Patent Registration No. 10-1207608 discloses a planar type rotating machine as described above. The disclosed planar type rotating machine includes a housing, a rotating shaft having one side portion and the other side portion respectively supported by one surface and the other surface of the housing and installed to be rotatable, a first support plate having a ring shape and coupled to the housing, a plurality of first tooth cores each having one surface radially coupled to the first support plate with respect to a center of the first support plate, bobbins coupled to outer surfaces of the other surfaces of the first tooth cores, a stator having coils wound around the bobbins, installed in the housing, and having a planar ring shape, a rotor coupled to the rotating shaft located in the housing, configured to react with the stator and rotate to rotate the rotating shaft, and having a planar ring shape, wherein first coupling rails, each having a cross section having a "T" shape in a lateral direction, are installed on the first support plate, the first coupling rail is coupled to the first support plate by a coupling member, a first press fitting groove formed in a shape corresponding to the first coupling rail and press fitted and coupled to the first coupling rail is formed in one end surface of the first tooth core, outer surfaces of the one surfaces of the first tooth cores coupled to the first support plate protrude outwardly more than the outer surfaces of the other surfaces and are in contact with each other, and the outer surfaces of the other surfaces of the first tooth cores are spaced apart from each other and coupled to the bobbins.

A core having a tooth shape is manufactured by stacking silicon steel plates having different sizes in a planar type rotating machine configured as above. Because of this, since a process in which molds corresponding to shapes of silicon steel plates are manufactured, silicon steel plates having the same size are stacked and cut, or the like is needed for molding silicon steel plates having different sizes, a manufacturing process is complex, and thus, there is a problem in that a manufacturing cost is increased.

Accordingly, because shapes are formed by compressing powders, soft magnetic powders which are easy to form into complex shapes have recently been used.

However, when an integrated core extruded using a soft magnetic powder is used, there is an advantage in that manufacturing is easy, but a high core loss occurs compared to a core formed by stacking electric steel plates, and thus, there is a problem in that magnetic properties are degraded.

SUMMARY OF CERTAIN INVENTIVE ASPECTS

One inventive aspect relates to providing a stator of a planar type motor which is easily manufactured and in which performance of the motor is maximized by reducing a core loss, and a planar type motor using the same.

One aspect of the present invention provides a stator of a planar type motor including: a support plate in which a plurality of first receiving grooves are formed in a circumferential surface thereof with a predetermined distance therebetween; a plurality of first cores inserted into the first receiving grooves, fixed to the support plate, and formed of a soft magnetic powder; second cores which are coupled to the plurality of the first cores, and in which electric steel plates having the same size are stacked in a direction perpendicular to the support plate and fixed to the first cores; and coils which are wound around and cover the first cores and the second cores.

The stator of a planar type motor according to the present invention may further include bobbins which cover and fix the first cores and the second cores and in which the coils are wound around outer surfaces thereof.

In the stator of a planar type motor according to the present invention, each of the first cores may include a fixing portion formed perpendicularly to the support plate, a first coupling portion formed on an upper surface of the fixing portion to be perpendicular to the fixing portion, having a second receiving groove formed therein and configured to accommodate the second core, and having an area which is greater than that of an upper surface of the second core to form a space between the first coupling portion and the support plate, and a second coupling portion positioned at an open portion of the second receiving groove into which the second core is inserted and configured to support the second core.

In the stator of a planar type motor according to the present invention, the support plate may include protruding portions which are formed on an inner surface of each of the first receiving grooves and protrude to face each other, and the fixing portion having a lower surface in which fixing grooves corresponding to the protruding portions of the support plate are formed, inserted into the first receiving groove of the support plate, and fixed therein by the protruding portions being inserted into the fixing grooves.

In the stator of a planar type motor according to the present invention, the support plate may be formed by stacking electric steel plates having the same size.

In the stator of a planar type motor according to the present invention, the support plate may further include a shaft system which protrudes from a center thereof in a direction perpendicular to the support plate.

In the stator of a planar type motor according to the present invention, the support plate may be formed of a soft magnetic powder.

Another aspect of the present invention provides a planar type motor including: a stator of the planar type motor; and a rotor positioned above the stator to be spaced apart from the stator and having a permanent magnet at a position facing the stator.

A planar type motor according to the described technology is easy to manufacture and performance thereof can be maximized by a first core, which is difficult to form by stacking electric steel plates, being formed of a soft magnetic powder, and arranging a second core, which is formed by stacking electric steel plates having the same size, at a region in which an eddy current is concentrated.

In addition, since a first core and a second core are not integrally formed with a support plate and coils are wound around a plurality of first cores and second cores and assembled on the support plate in a planar type motor according to the described technology, separate spaces are not needed for winding the coils, and thus, spaces between adjacent first cores are minimized and torque ripples can be reduced.

DETAILED DESCRIPTION OF CERTAIN INVENTIVE EMBODIMENTS

The following description will be made focusing on configurations necessary to understand embodiments of the invention. Therefore, descriptions of other configurations that might obscure the gist of the invention will be omitted.

Terms and words used in this specification and claims are not to be interpreted as limited to commonly used meanings or meanings in dictionaries and should be interpreted as having meanings and concepts which are consistent with the technological scope of the invention based on the principle that the inventor has appropriately defined concepts of terms in order to describe the invention in the best way. Therefore, since the embodiments described in this specification and configurations illustrated in the drawings are only exemplary embodiments and do not represent the overall technological scope of the invention, it should be understood that the invention covers various equivalents, modifications, and substitutions at the time of filing of this application.

Hereinafter, an embodiment of the present invention will be described in detail with reference to the accompanying drawings.

Figure 1:
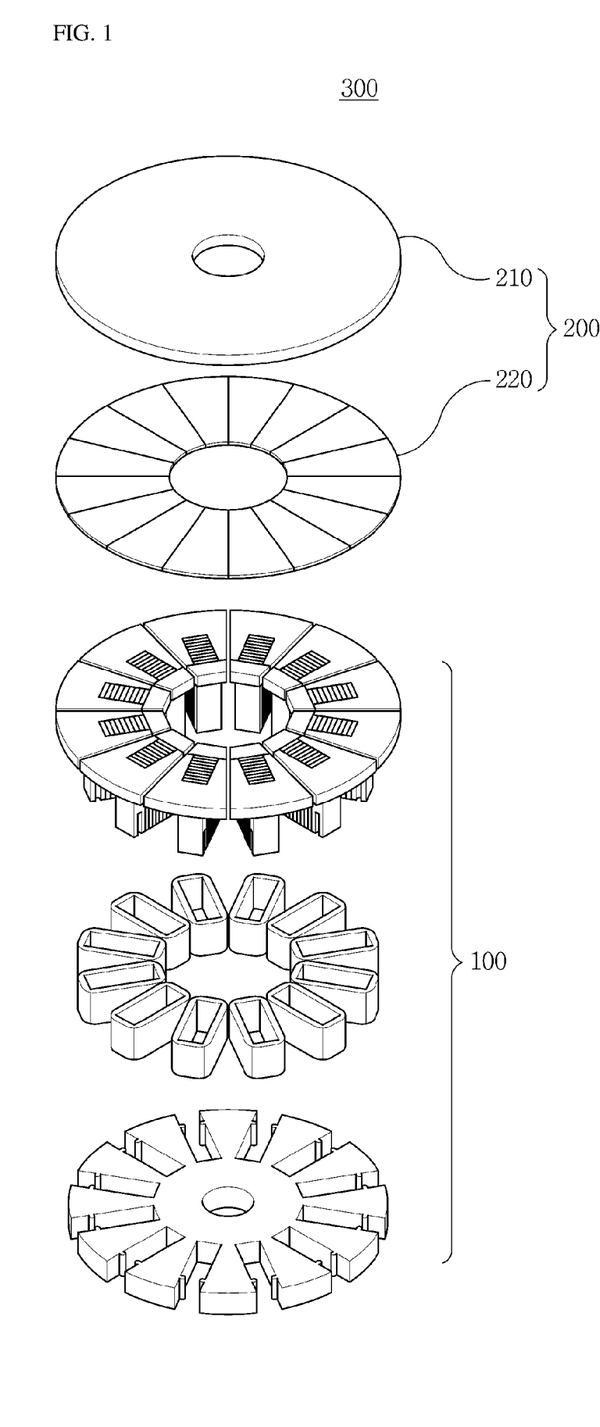
FIG. 1 is an exploded perspective view illustrating a planar type motor according to a first embodiment of the present invention.
Figure 2:
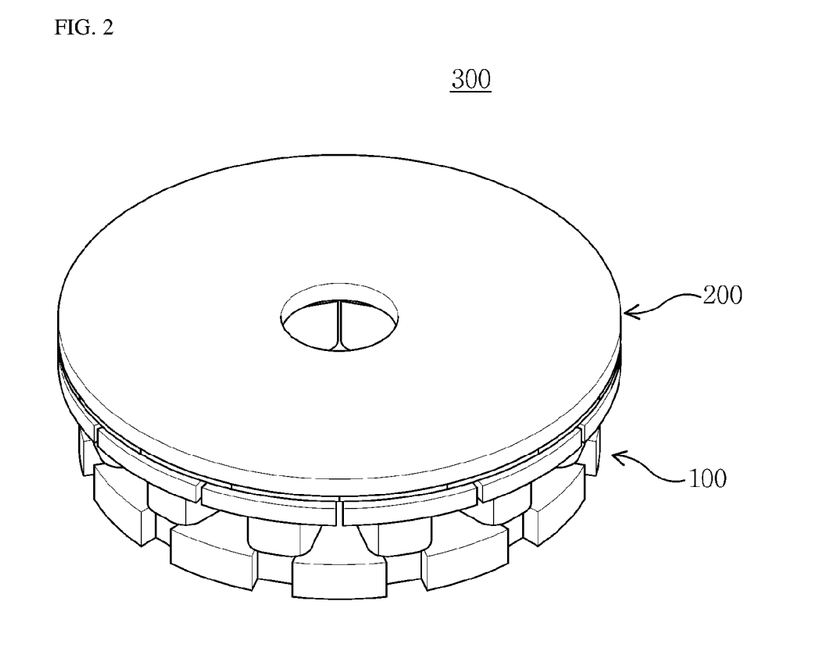
FIG. 2 is an assembled perspective view illustrating the planar type motor according to the first embodiment of the present invention.

FIG. 1 is an exploded perspective view illustrating a planar type motor according to a first embodiment of the present invention, and FIG. 2 is an assembled perspective view illustrating the planar type motor according to the first embodiment of the present invention.

Referring to FIGS. 1 and 2, a planar type motor 300 according to the first embodiment of the present invention includes a stator 100 and a rotor 200 provided to be rotatable with respect to the stator 100. The rotor 200 includes a second support plate 210 and permanent magnets 220 spaced apart from the stator and provided on one surface of the second support plate 210 facing the stator 100.

The planar type motor 300 is operated by the rotor 200, which is provided to rotate in a state in which a predetermined gap is formed between the rotor 200 and the stator 100, by a repulsive or attractive force being generated between the stator 100 and the permanent magnets 220 of the rotor 200 to generate rotational torque by changing a direction of a current flowing through the stator 100.

Hereinafter, the stator 100 according to the first embodiment of the present invention will be described in more detail.

Figure 3:
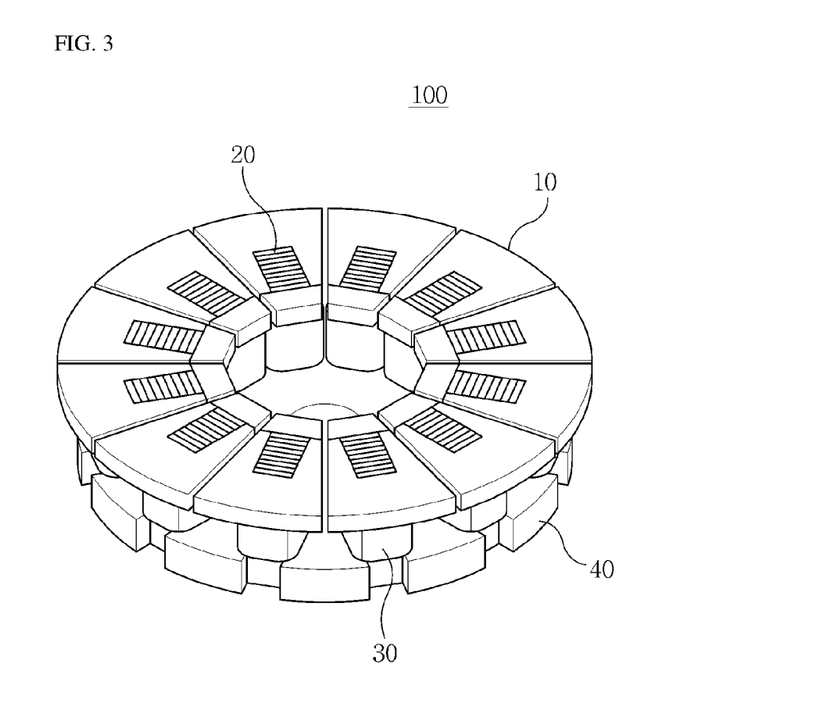
FIG. 3 is an assembled perspective view illustrating a stator of the planar type motor according to the first embodiment of the present invention.
Figure 4:
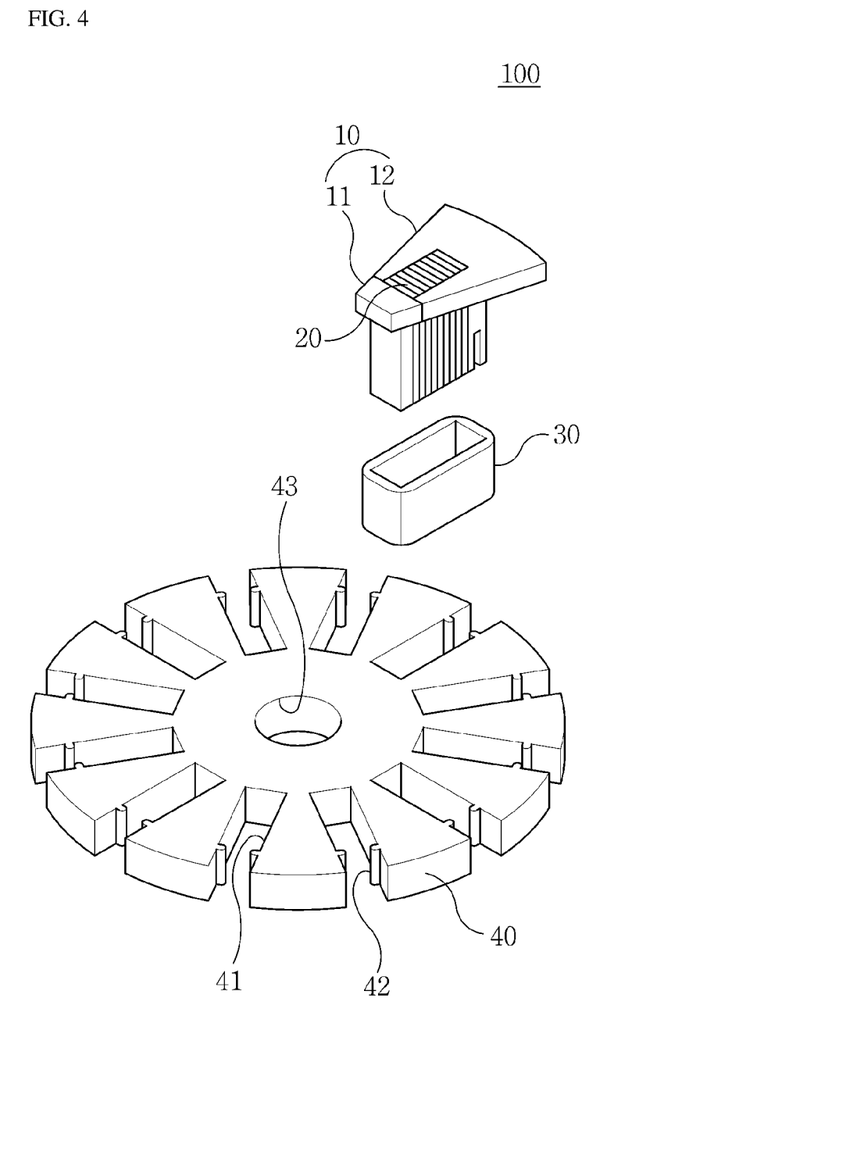
FIG. 4 is a perspective view illustrating a state in which the stator of the planar type motor according to the first embodiment of the present invention is being assembled.
Figure 5:
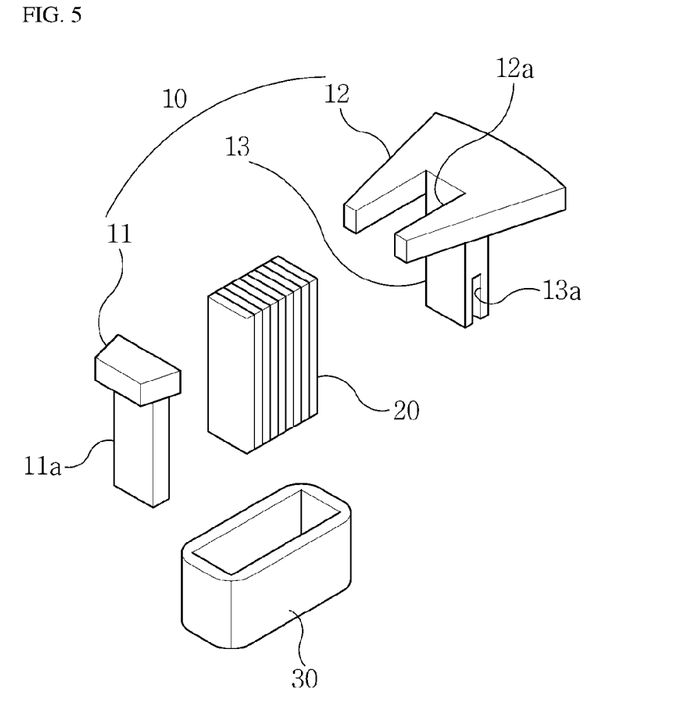
FIG. 5 is an exploded view illustrating a first core, second core, and coil of the stator of the planar type motor according to the first embodiment of the present invention.

FIG. 3 is an assembled perspective view illustrating the stator of the planar type motor according to the first embodiment of the present invention, FIG. 4 is a perspective view illustrating a state in which the stator of the planar type motor according to the first embodiment of the present invention is being assembled, and FIG. 5 is an exploded view illustrating a first core, second core, and coil of the stator of the planar type motor according to the first embodiment of the present invention.

Referring to FIGS. 3 to 5, the stator 100 according to the first embodiment of the present invention includes a support plate 40, first cores 10, second cores 20, and coils 30.

The support plate 40, which is in a ring shape, has a central portion having a shaft insertion hole 43 into which a shaft is inserted, and has a circumferential surface in which a plurality of first receiving grooves 41 are formed to have a predetermined distance therebetween. Here, the first cores 10 and the second cores 20 are inserted into the first receiving grooves 41, and the first receiving grooves 41 are formed to correspond to the number of, and lower shapes of, the first cores 10 and second cores 20.

Such a support plate 40 is formed by stacking electric steel plates (silicon steel plates) having the same size. That is, the support plate 40 is formed by stacking a plurality of electric steel plates in which the first receiving grooves 41, which are spaced apart from each other, are formed in a ring shape at a circumferential surface thereof.

In addition, protruding portions 42 which protrude may be formed in the first receiving grooves 41 of the support plate 40. The protruding portions 42 may be formed on a side surface of each of the first receiving grooves 41 to face each other, and each of the first cores 10 may be fixedly inserted into the first receiving groove 41.

The plurality of first cores 10 are provided, partially inserted into the first receiving grooves 41 formed at the support plate 40 with a predetermined distance therebetween, and fixed to the support plate 40.

The first core 10 is formed of a soft magnetic powder. Since such a soft magnetic powder includes an insulated iron (Fe) powder, an eddy current loss may be minimized, and since the powder is compressed to be formed into a shape, it is easy to form the powder into a complex shape.

Such a first core 10 includes a fixing portion 13, a first coupling portion 12, and a second coupling portion 11.

The fixing portion 13 is formed to be perpendicular to the support plate 40, and fixing grooves 13a corresponding to the protruding portions 42 of the support plate 40 may be formed in a lower surface thereof. The fixing portion 13 is inserted into the first receiving groove 41 of the support plate 40, and the protruding portions 42 are inserted into and coupled to the fixing grooves 13a, and thus the fixing portion 13 may be fixed to the support plate 40.

In addition, an area of a contact surface of the fixing portion 13, which is in contact with the second core 20, is the same as that of the second core 20, and thus the fixing portion 13 may support the second core 20.

The first coupling portion 12 is formed on an upper surface of the fixing portion 13 to be perpendicular to the fixing portion 13, and a second receiving groove 12a configured to accommodate the second core 20 may be formed in the first coupling portion 12.

That is, the fixing portion 13 may support one side surface of the second core 20 inserted into the second receiving groove 12a of the first coupling portion 12. The second core 20 inserted into the second receiving groove 12a is inserted into the first receiving groove 41 of the support plate 40 together with the fixing portion 13.

In addition, the first coupling portion 12 is formed to have an area which is greater than that of an upper surface of the second core 20, and thus a space in which the coil 30 is wound between the first coupling portion 12 and the support plate 40 is formed. Here, a distance between the first coupling portion 12 and an adjacent first coupling portion 12 affects a torque ripple of the planar type motor 300.

For example, when the support plate 40, the first cores 10, and second cores 20 are integrally formed, adjacent first coupling portions 12 are formed to be spaced apart from each other to secure spaces for winding the coils 30. As described above, when the spaces for winding the coils 30 are secured, a torque ripple of the planar type motor 300 is increased, and thus, vibration or noise can occur.

Accordingly, in the first embodiment of the present invention, the plurality of first cores 10 and second cores 20 are provided and individually assembled to the support plate 40 to minimize a distance between adjacent first coupling portions 12, and thus, the torque ripple generated in the planar type motor 300 can be reduced.

For example, when the fixing portion 13 is assembled to the support plate 40, the first coupling portion 12 may be formed to be in contact with an adjacent first coupling portion 12.

The second coupling portion 11 may be positioned at an open portion of the second receiving groove 12a and support the second core 20 inserted into the second receiving groove 12a.

The second core 20 is formed by stacking electric steel plates having the same size in a direction perpendicular to the support plate 40, is inserted into the second receiving groove 12a such that an upper portion thereof is exposed, and is supported by the fixing portion 13 and the second coupling portion 11.

Here, since the second core 20 is manufactured with electric steel plates having excellent magnetic properties and a small core loss compared to a soft magnetic powder, the second core 20 has excellent magnetic properties compared to the first core 10 formed of the soft magnetic powder.

That is, in the present embodiment, since the second core 20 formed by stacking the electric steel plates, and the fixing portion 13, the first coupling portion 12, and the second coupling portion 11 formed of the soft magnetic powder are included, the first core 10, which is difficult to manufacture by stacking electric steel plates, is formed of the soft magnetic powder, and the second core 20 formed by stacking electric steel plates having the same size is disposed at a region in which an eddy current is concentrated, the planar type motor 300 is easily manufactured and performance thereof is maximized Meanwhile, the coil 30 is wound around and covers lower portions of the first core 10 and the second core 20. That is, the coil 30 may be wound around and cover the fixing portion 13 of the first core 10, the second core 20, and the second coupling portion 13 of the first core 10.

The stator 100 of the planar type motor according to the first embodiment of the present invention may further include bobbins (not shown), each of which covers and is fixed to the first core 10 and the second core 20 and has an outer surface on which the coil 30 is wound.

Since the bobbin is positioned at an inner surface of the coil 30, which is wound around and covers the lower portions of the first core 10 and the second core 20, the bobbin may support the fixing portion 13 of the first core 10, the second core 20, and the second coupling portion 11 of the first core 10 and prevent a short which occurs among the coil 30, the first core 10, and the second core 20.

Accordingly, since the planar type motor 300 according to the first embodiment of the present invention includes the first core 10 formed of the soft magnetic powder at a portion which is connected to the support plate 40 that requires complex forming, and the second core 20 formed by stacking electric steel plates having the same size at a portion in which an eddy current intensively occurs, the planar type motor 300 is easy to manufacture and the performance thereof can be maximized.

In addition, since the planar type motor 300 according to the first embodiment of the present invention includes the plurality of first cores 10 and the second cores 20 around which the coils 30 are wound and which are coupled to the support plate 40, spaces for winding the coils 30 are not needed, and thus, spaces between adjacent first cores 10 are minimized and a torque ripple can be reduced.

Figure 6:
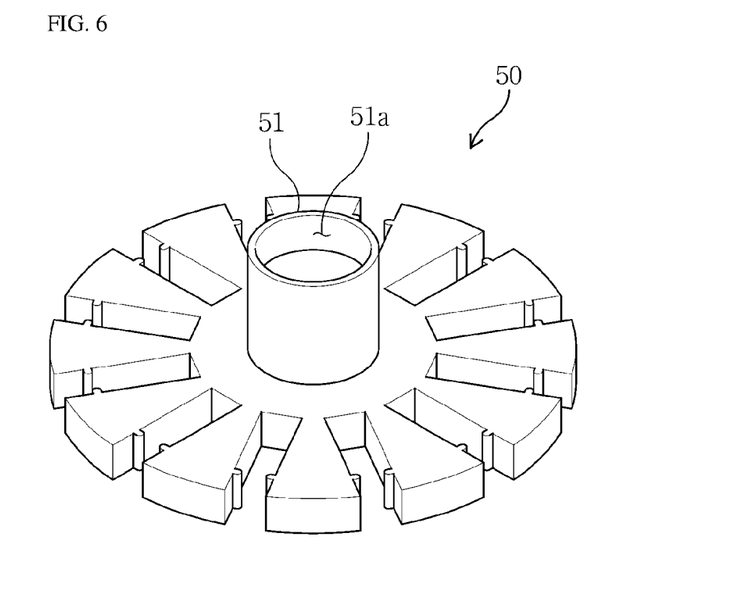
FIG. 6 is a perspective view illustrating a structure of a support plate of a stator according to a second embodiment of the present invention.

Hereinafter, a structure of a support plate 50 of a stator according to a second embodiment of the present invention will be described.

Meanwhile, another embodiment, which will be described below, has substantially the same components as the first embodiment. Accordingly, the same components will not be repeatedly described, and thus, the same reference numerals and names will be assigned to the same components.

FIG. 6 is a perspective view illustrating a structure of the support plate of the stator according to the second embodiment of the present invention.

Referring to FIGS. 1 to FIG. 6, the support plate 50 of the stator according to the second embodiment of the present invention further includes a shaft system 51 which protrudes from a center of the support plate 50 in a direction perpendicular thereto.

The shaft system 51 may have a cylindrical shape perpendicularly extending from the center of the support plate 50, and a shaft may be inserted into the shaft system 51. The shaft system 51 may support and stably rotate a motor by expanding a surface area in contact with the inserted shaft.

Here, the support plate 50 may be formed of a soft magnetic powder. A support plate 40 is formed of the soft magnetic powder with which forming is easy, and thus, the support plate 40 may be simply integrally formed with the shaft system 51.

Figure 7:
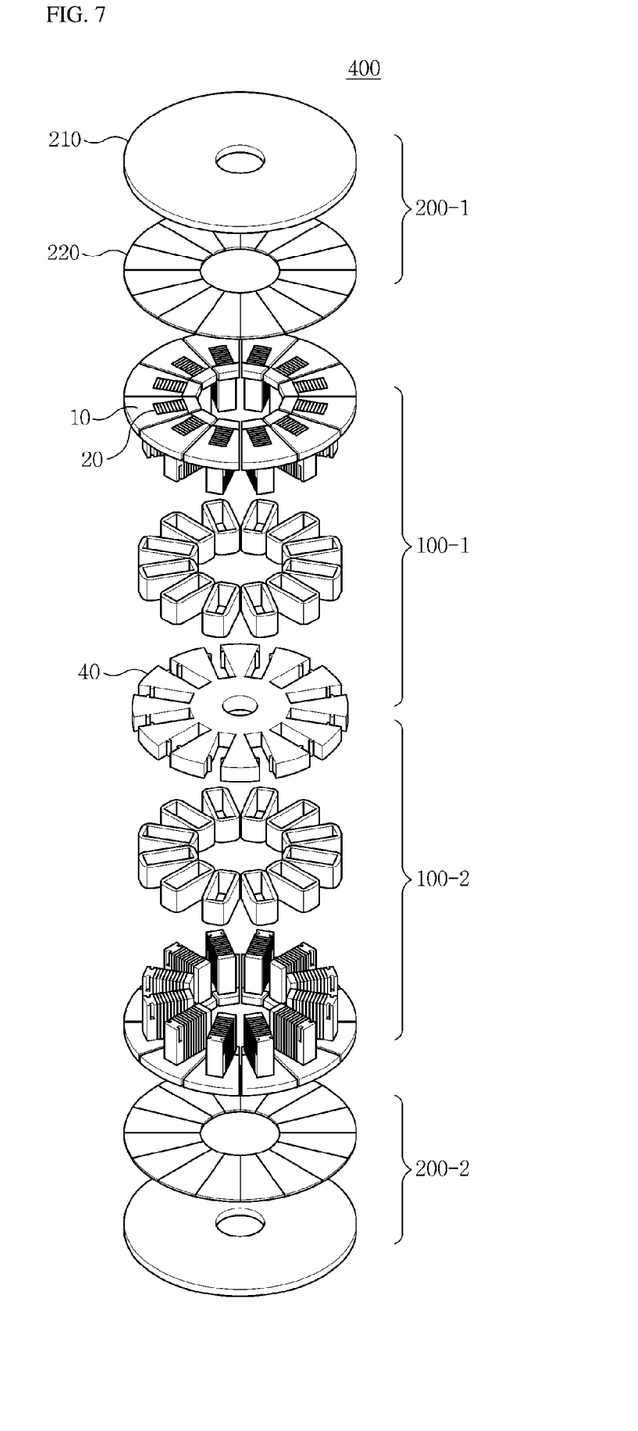
FIG. 7 is an exploded perspective view illustrating a planar type motor according to a third embodiment of the present invention.
Figure 8:
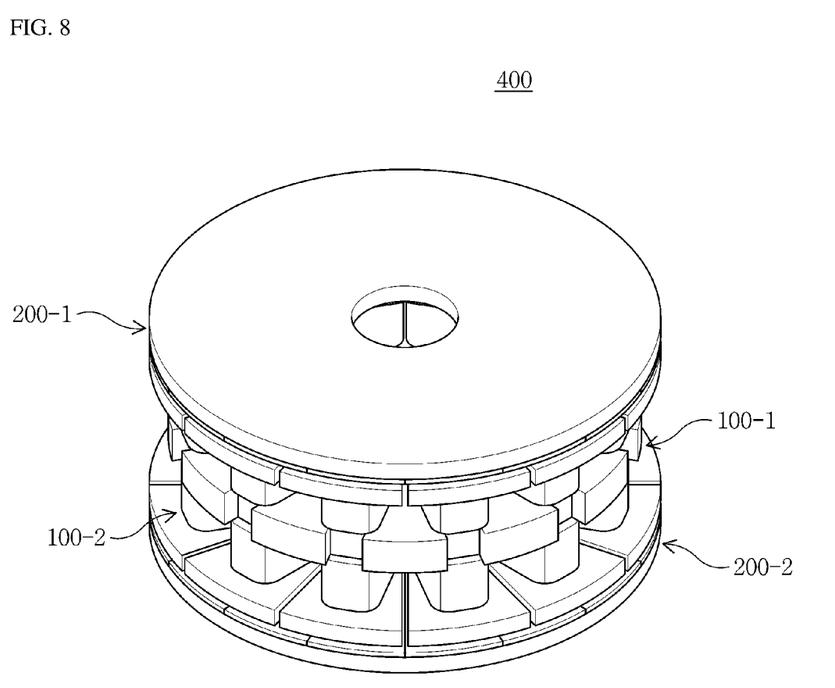
FIG. 8 is an assembled perspective view illustrating the planar type motor according to the third embodiment of the present invention.

Hereinafter, a structure of a planar type motor 400 according to a third embodiment of the present invention will be described.

FIG. 7 is an exploded perspective view illustrating the planar type motor according to the third embodiment of the present invention, and FIG. 8 is an assembled perspective view illustrating the planar type motor according to the third embodiment of the present invention.

Referring to FIGS. 7 and 8, the planar type motor 400 according to the third embodiment of the present invention may include a plurality of stators 100-1 and 100-2 and a plurality of rotors 200-1 and 200-2 in order to correspond to each other.

Here, the plurality of rotors 200-1 and 200-2 are positioned at an outermost portion, and the stators 100-1 and 100-2 may be positioned between the rotors 200-1 and 200-2. Here, adjacent stators 100-1 and 100-2 commonly use one support plate 40, and first cores 10 and second cores 20 may be inserted into both side surfaces of the support plate 40.

The rotors 200-1 and 200-2 may be disposed outside the stators 100-1 and 100-2 to be spaced apart from each other so that permanent magnets 220 are disposed in the rotors 200-1 and 200-2.

Figure 9:
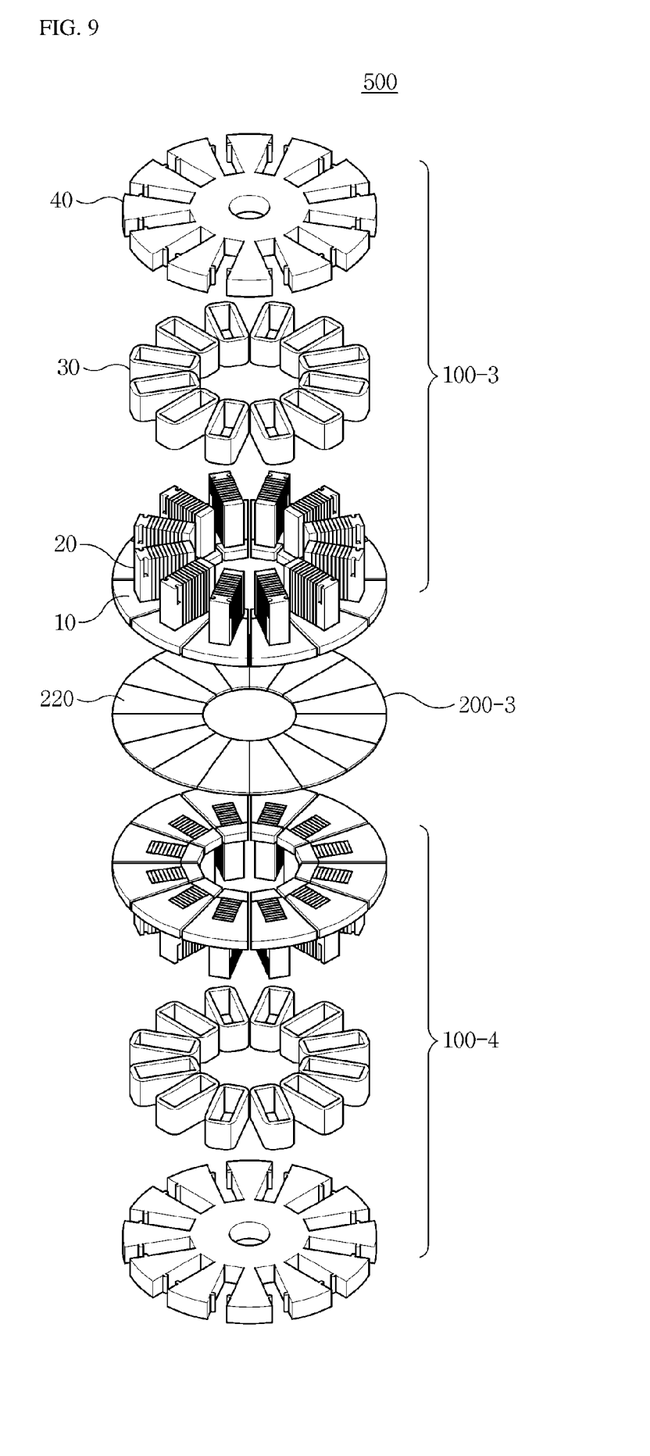
FIG. 9 is an exploded perspective view illustrating a planar type motor according to a fourth embodiment of the present invention.
Figure 10:
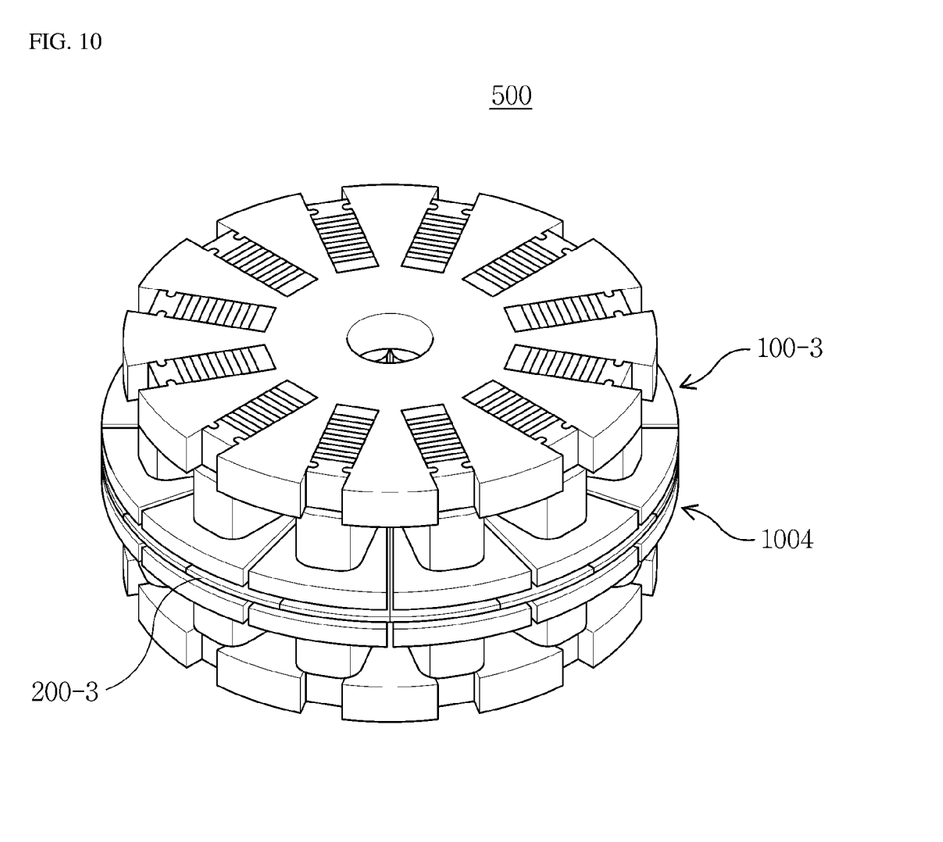
FIG. 10 is an assembled perspective view illustrating the planar type motor according to the fourth embodiment of the present invention.

Hereinafter, a structure of a planar type motor 500 according to a fourth embodiment of the present invention will be described.

FIG. 9 is an exploded perspective view illustrating the planar type motor according to the fourth embodiment of the present invention, and FIG. 10 is an assembled perspective view illustrating the planar type motor according to the fourth embodiment of the present invention.

Referring to FIGS. 9 and 10, the planar type motor 500 according to the fourth embodiment of the present invention may include stators 100-3 and 100-4, and a rotor 200-3 positioned between the stators.

Here, the plurality of stators 100-3 and 100-4 may be positioned at an outermost portion, and the rotor 200-3 may be positioned between the stators 100-3 and 100-4. Here, the rotor 200-3 commonly uses one second support plate (not shown), and permanent magnets 220 may be formed at both side surfaces of the second support plate.

First cores 10 and second cores 20 of the stators 100-3 and 100-4 may be disposed to be spaced apart from the permanent magnets 220 of the rotor 200-3.

Meanwhile, the embodiments disclosed in this specification and drawings are only examples to facilitate understanding of the invention, and the invention is not limited thereto. It should be clear to those skilled in the art that various modifications based on the technological scope of the invention in addition to the embodiments disclosed herein can be made.

The invention claimed is:

1. A stator for a planar type motor comprising:
a support plate in which a plurality of first receiving grooves are formed in a circumferential surface thereof with a predetermined distance therebetween;
a plurality of first cores inserted into the first receiving grooves, fixed to the support plate, and formed of a soft magnetic powder;
a plurality of second cores each coupled to a corresponding one of the plurality of the first cores, each of the plurality of second cores comprises a plurality of electric steel plates stacked onto each other, the plurality of electric steel plates having the same size and extending along a direction perpendicular to the support plate and fixed to the first cores; and
coils which are wound around and cover the first cores and the second cores,
wherein each of the plurality of first cores includes:
a fixing portion formed perpendicularly to the support plate;
a first coupling portion formed on an upper surface of the fixing portion to be perpendicular to the fixing portion, the first coupling portion having a second receiving groove formed therein and configured to accommodate a corresponding one of the plurality of second cores, and the first coupling portion having an area which is greater than that of an upper surface of the corresponding second core to form a space between the first coupling portion and the support plate; and
a second coupling portion configured to support the second core and positioned at an open portion of the second receiving groove into which the second core is inserted.

2. The stator of claim 1, further comprising bobbins which cover and fix the plurality of first cores and the plurality of second cores and in which the coils are wound around outer surfaces thereof.

3. The stator of claim 1, wherein:
the support plate includes protruding portions which are formed on an inner surface of each of the first receiving grooves and protrude to face each other; and
the fixing portion having a lower surface in which fixing grooves corresponding to the protruding portions of the support plate are formed, inserted into the first receiving groove of the support plate, and fixed therein by the protruding portions being inserted into the fixing grooves.

4. The stator of claim 1, wherein the support plate comprises a plurality of electric steel plates having the same size and stacked onto each other.

5. The stator of claim 1, wherein the support plate further includes a shaft system which protrudes from a center thereof in a direction perpendicular to the support plate.

6. The stator of claim 5, wherein the support plate is formed of a soft magnetic powder.

7. A planar type motor comprising:
the stator of claim 1; and
a rotor positioned above the stator and apart from the stator, the rotor comprising a permanent magnet at a position facing the stator.

* * * * *